(12) United States Patent
Hwang et al.

(10) Patent No.: US 11,982,898 B2
(45) Date of Patent: May 14, 2024

(54) DISPLAY DEVICE

(71) Applicants: LG Display Co., Ltd., Seoul (KR);
ILDONG CHEMICAL Co., LTD, Daegu (KR)

(72) Inventors: Junsik Hwang, Seoul (KR); SungHee Kim, Paju-si (KR); Ki Moon Kim, Daegu (KR); Joonhyuk Cho, Hwaseong-si (KR); JaeHuy Park, Daegu (KR); Eun Ji Lee, Daegu (KR)

(73) Assignees: LG Display Co., Ltd., Seoul (KR);
ILDONG CHEMICAL Co., LTD, Daegu (KR)

( * ) Notice: Subject to any disclaimer, the term of this patent is extended or adjusted under 35 U.S.C. 154(b) by 46 days.

(21) Appl. No.: 17/974,235

(22) Filed: Oct. 26, 2022

(65) Prior Publication Data

US 2023/0213810 A1 Jul. 6, 2023

(30) Foreign Application Priority Data

Dec. 30, 2021 (KR) .................. 10-2021-0193463

(51) Int. Cl.
*B32B 27/28* (2006.01)
*G02F 1/1333* (2006.01)
*G02F 1/1335* (2006.01)

(52) U.S. Cl.
CPC ...... *G02F 1/133531* (2021.01); *B32B 27/283* (2013.01); *G02F 1/13338* (2013.01); *C09K 2323/05* (2020.08)

(58) Field of Classification Search
CPC ........... G02F 1/133531; G02F 1/13338; B32B 27/283; C09K 2323/05

(Continued)

(56) References Cited

U.S. PATENT DOCUMENTS

2016/0177109 A1 6/2016 Hendricks et al.

FOREIGN PATENT DOCUMENTS

KR 10-2015-0035256 A 4/2015
KR 20150035256 A * 4/2015

(Continued)

OTHER PUBLICATIONS

Håkansson et al., "Effect of (3-Glycidyloxypropyl)Trimethoxysilane (GOPS) on the Electrical Properties of PEDOT: PSS Films," Journal of Polymer Science, Part B: Polymer Physics, 55: 814-820 (2017).

*Primary Examiner* — Ruiyun Zhang
(74) *Attorney, Agent, or Firm* — Morgan, Lewis & Bockius LLP (57) ABSTRACT

The present disclosure relates to a display device, and according to an aspect of the present disclosure, a display device includes a display panel, a first polarizer disposed below the display panel, a second polarizer disposed on the display panel, and an antistatic film disposed between the display panel and the second polarizer, in which the antistatic film includes a silicon-based matrix and a polythiophene-based compound and a dopant having a high boiling point dispersed in the silicon-based matrix and the silicon-based matrix contains tetra alkoxysilane, glycidyloxyalkyl trialkoxysilane and aminoalkyl trialkoxysilane to be cured. Therefore, the display device includes an antistatic film including an inexpensive polythiophene compound as a conductive material so that the excellent high temperature and high humidity stability is provided as well as the excellent electrostatic discharging effect.

13 Claims, 5 Drawing Sheets

(58) Field of Classification Search
USPC .................................. 428/1.5, 1.51, 1.52
See application file for complete search history.

(56) References Cited

FOREIGN PATENT DOCUMENTS

| | | | |
|---|---|---|---|
| KR | 10-2017-0101208 A | 9/2017 | |
| KR | 10-2018-0049411 A | 5/2018 | |
| KR | 10-2019-0088608 A | 7/2019 | |
| WO | WO-2014016194 A1 * | 1/2014 | ............. H01B 1/127 |

* cited by examiner

FIG. 5 ved by the touch so that
discharging is caused. Therefore, a touch sensitivity is
significantly lowered. Accordingly, in order to simultane-

DISPLAY DEVICE

CROSS-REFERENCE TO RELATED APPLICATIONS

This application claims the priority of Korean Patent Application No. 10-2021-0193463 filed on Dec. 30, 2021, in the Korean Intellectual Property Office, the disclosure of which is incorporated herein by reference.

BACKGROUND

Technical Field

The present disclosure relates to a display device, and more particularly, to a display device which includes an antistatic film having excellent high temperature and high humidity reliability to improve the reliability of the display device, reduce a cost, and simplify an antistatic film forming process.

Discussion of the Related Art

Recently, as it enters an information era, a display field which visually expresses electrical information signals has been rapidly developed, and in response to this, various display devices having excellent performances such as thin-thickness, light weight, and low power consumption have been developed. Specific examples of such a display device include a liquid crystal display device (LCD), a plasma display panel device (PDP), a field emission display device (FED), and an organic light emitting display device (OLED).

Generally, in a liquid crystal display device, two substrates each having one surface on which an electrode is formed are disposed such that surfaces with the electrodes formed thereon are opposite to each other. After interposing a liquid crystal material between two substrates, liquid crystal molecules move by an electric field generated by applying a voltage to the electrode formed on each substrate to display images by transmittance of light which varies by the electric field. At this time, when each substrate of the liquid crystal display device is manufactured, a lot of static electricity is generated during the process of performing unit processes.

Accordingly, in order to discharge the static electricity and effectively emit charges charged when the completed product is formed, indium tin oxide (ITO) or indium zinc oxide (IZO) which are transparent conductive materials are provided on an outer surface of an upper substrate to be utilized as an antistatic film. However, indium tin oxide (ITO) or indium zinc oxide (IZO) is very expensive transparent conductive metal materials, which increases a manufacturing cost.

In recent years, products which have a built-in touch sensor to be operated by touching a screen have been released, such as mobile phones, table PCs, and notebook computers which can be carried individually, to attract a lot of attentions from users. In line with this trend, various attempts are being made recently to give a touch function to a liquid crystal display device which is used as a display element in various application products. For example, in an add-on type liquid crystal display device, a substrate or a panel in which a separate touch element is formed is attached onto a liquid crystal panel. As another example, in an in-cell type liquid crystal display device, a touch electrode is formed in a display panel unit without attaching a separate touch panel onto the display device so that a touch function is mounted therein. Between them, the in-cell type liquid crystal display device has advantages of slimness, cost reduction, and weight reduction so that demands thereof are increasing recently.

SUMMARY

In the in-cell type liquid crystal display device, when an antistatic film is formed of a transparent conductive metal material such as ITO, even though a touch sensor is provided, a conductivity of the antistatic film is larger than a magnitude of a capacitance caused by the touch so that discharging is caused. Therefore, a touch sensitivity is significantly lowered. Accordingly, in order to simultaneously secure the touch sensitivity and the electrostatic discharging effect, the antistatic film needs to be formed of a material having a resistance in a specific band. Therefore, a method of placing a polarizer with a conductive layer which has a resistance in a specific band formed on an upper surface, on a display panel has been proposed. However, in this case, other problems such as complex processing steps and increased cost are caused.

Therefore, a method of forming an antistatic film by coating a solution in which conductive materials such as carbon nano tube or polythiophene-based polymer (for example, PEDOT:PSS) are dispersed between an upper polarizer and a display panel has been proposed. The carbon nano tube has an excellent high temperature stability, but has a problem in that cost reduction is limited due to the expensive material. Further, the polythiophene-based polymer is cheaper than the carbon nano tube, but has inferior high temperature and high humidity stability.

Accordingly, embodiments of the present disclosure are directed to a display device that substantially obviates one or more of the problems due to limitations and disadvantages of the related art.

An aspect of the present disclosure is to provide a display device including an antistatic film which uses an inexpensive polythiophene-based polymer to have the excellent electrostatic discharging effect and the excellent high temperature and high humidity reliability.

Another aspect of the present disclosure is to provide a display device which has the excellent electrostatic discharging effect without degrading a touch sensitivity.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel; a first polarizer disposed below the display panel; a second polarizer disposed on the display panel; and an antistatic film disposed between the display panel and the second polarizer, in which the antistatic film includes a silicon-based matrix and a polythiophene-based compound and a dopant having a high boiling point dispersed in the silicon-based matrix and the silicon-based matrix contains tetra alkoxysilane, glycidyloxyalkyl trialkoxysilane and aminoalkyl trialkoxysilane to be cured.

According to another aspect of the present disclosure, the silicon-based matrix may be cured further including (per)

fluoroalkyl alkoxysilane and a compound represented by the following Chemical Formula 1

[Chemical Formula 1]

(In Chemical Formula 1, $R_1$ is selected from hydrogen, an alkyl group having 1 to 10 carbon atoms, and a branched alkyl group having 3 to 10 carbon atoms, n is an integer of 1 to 100, and m is an integer of 1 to 10.)

Other detailed matters of the exemplary embodiments are included in the detailed description and the drawings.

According to the present disclosure, the display device includes an antistatic film including an inexpensive polythiophene compound as a conductive material so that the excellent high temperature and high humidity stability is provided as well as the excellent electrostatic discharging effect.

Further, according to the present disclosure, the electrostatic discharging effect is excellent without degrading the touch sensitivity.

Further, according to the present disclosure, in the display device, an antistatic film is formed between the display panel and the upper polarizer by a simple process to simplify the process and contribute to cost reduction and productivity improvement.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

Figure 1:
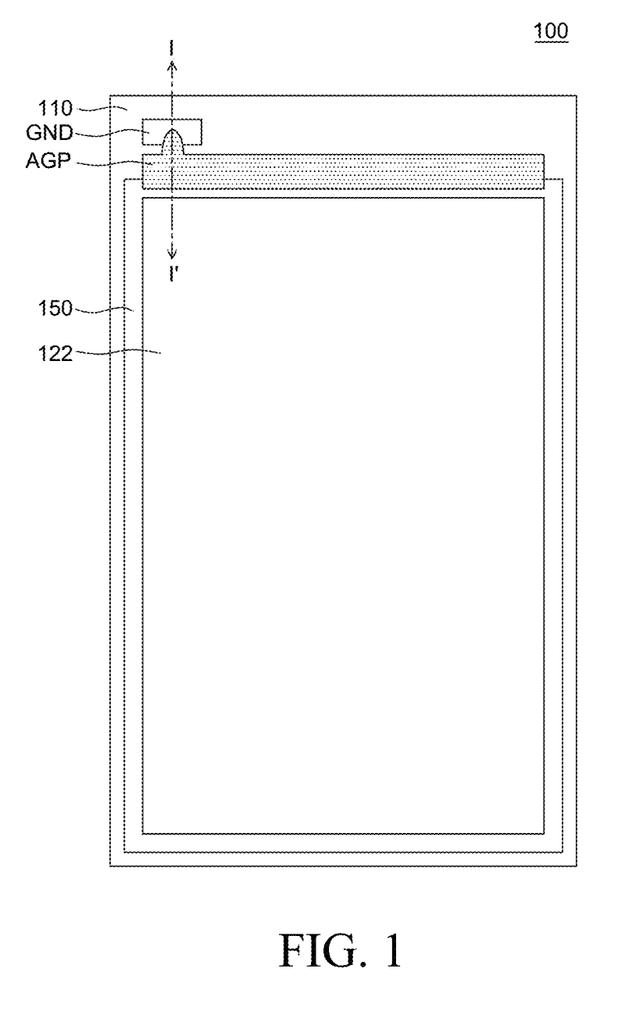
FIG. 1 is a schematic plan view of a display device according to an exemplary embodiment of the present disclosure.
Figure 2:
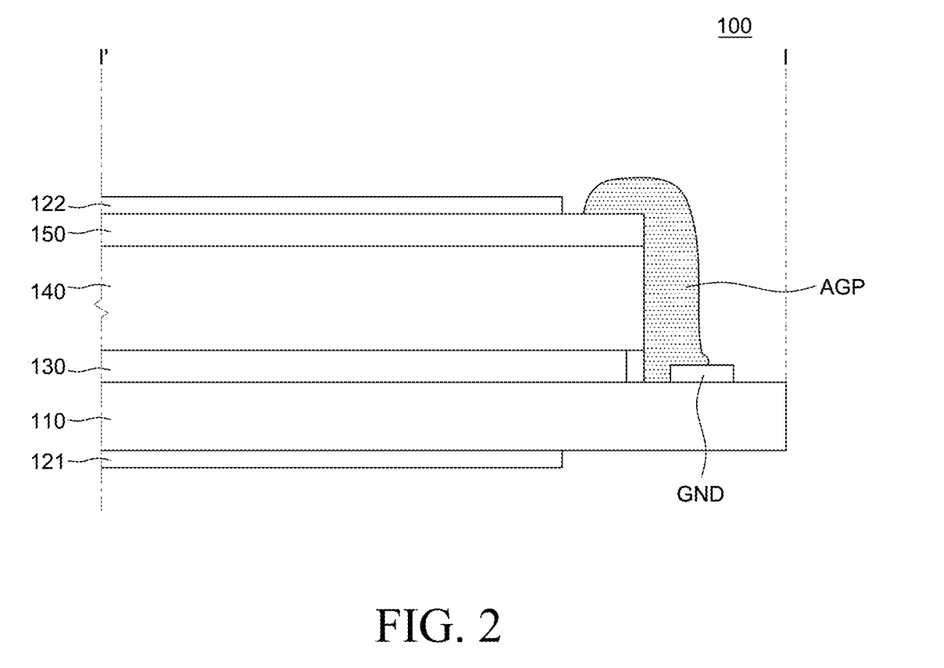
FIG. 2 is a schematic cross-sectional view taken along a line I-I' of FIG. 1.

FIG. 1 is a schematic plan view of a display device according to an exemplary embodiment of the present disclosure. FIG. 2 is a schematic cross-sectional view taken along the line I-I' of FIG. 1. Referring to FIGS. 1 and 2, a display device 100 according to an exemplary embodiment of the present disclosure includes a display panel PNL including a lower substrate 110, a liquid crystal layer 130, and an upper substrate 140, a first polarizer 121, a second polarizer 122, an antistatic film 150, a ground pad GND, and a conductive member AGP.

The display panel PNL is a panel which displays an image. For example, the display panel PNL may be a liquid crystal display panel which includes a liquid crystal layer and adjusts a light transmittance of the liquid crystal to display images. Hereinafter, the display device 100 according to the exemplary embodiment of the present disclosure will be described in detail by assuming that the display panel PNL is a liquid crystal display panel, but the display panel PNL is not limited to the liquid crystal display panel.

The display panel PNL includes areas which are defined as a display area and a non-display area. The display area is an area where a plurality of pixels is disposed to substantially display images. In the display area, a pixel including an emission area for displaying images and a driving element for driving the pixel, such as a driving thin film transistor, are disposed. The non-display area is an area which is blocked by a light shielding member so that an image is not actually displayed. In the non-display area, various wiring lines and printed circuit boards for driving the pixels and the driving elements disposed in the display area are disposed.

A backlight unit may be disposed on a rear surface of the display panel PNL. The backlight unit is a light source which supplies light to the liquid crystal display panel. For example, the backlight unit may be an edge type backlight unit or a direct-type backlight unit.

The display panel PNL may be an in-cell touch type display panel with an embedded touch sensor. Hereinafter, for the convenience of description, it is assumed that the display panel PNL is an in-cell touch type display panel. However, this is an example, and the display panel PNL of the present disclosure is not limited to the in-cell touch type display panel.

The lower substrate 110 is a thin film transistor array substrate equipped with a plurality of pixels and a thin film transistor for driving each of the pixel. A plurality of gate lines and a plurality of data lines are formed on the lower substrate 110 to intersect to define a plurality of pixel areas. A thin film transistor for driving the pixel may be provided at each intersection of the plurality of gate lines and the plurality of data lines.

Each thin film transistor is connected to a pixel electrode formed in each pixel to supply a data voltage which is supplied through the data lines in response to a scan signal applied through the gate lines to each pixel.

A common electrode forms an electric field together with the pixel electrode to control the liquid crystals. An electric field is formed according to a data voltage and a common voltage applied through the data line to control the arrangement of the liquid crystals to drive the liquid crystal layer 130.

Each of the common electrode and the pixel electrode may be formed of a transparent conductive material such as indium tin oxide (ITO) or indium zinc oxide (IZO).

The lower substrate 110 includes a touch sensor for sensing a capacitance according to the touch of the user to detect the touch. For example, the touch sensor may include a plurality of driving electrodes to which a touch driving signal is supplied and a plurality of sensing electrodes which senses the touch signal. A touch driver is disposed on the lower substrate 110 corresponding to the non-display area. The touch driver may include a touch driving IC and a touch sensing IC. The touch driving IC supplies a touch driving signal to a plurality of touch driving electrodes through a driving electrode line. The touch sensing IC is connected to the plurality of sensing electrodes through the touch sensing electrode line to sense the touch signal.

In the in-cell touch type display panel, a common electrode formed to supply a common voltage to the pixel is patterned to be used as a driving electrode and a sensing electrode.

The ground pad GND may be disposed on the lower substrate 110 corresponding to the non-display area to ground charges formed by a static electricity. The ground pad GND discharges charges accumulated by the static electricity. The ground pad GND is electrically connected to the antistatic film 150 by means of a conductive member AGP to be described below.

The upper substrate 140 is a color filter array substrate including a color filter and a black matrix. The color filter selectively transmits light having a specific wavelength. Therefore, the light emitted from the backlight unit is converted into various color light while passing through the liquid crystal layer 130 and the color filter between the lower substrate 110 and the upper substrate 140. For example, the color filter includes red, green, and blue color filters and the red, green, and blue color filters are disposed so as to correspond to colors displayed by each pixel. The black matrix is formed so as to correspond to the boundary of the pixels to divide each pixel and suppress the color mixture. Further, the black matrix may conceal the gate lines, the data lines, or the thin film transistors disposed on the lower substrate 110 so as not to be visibly recognized.

The liquid crystal layer 130 is disposed between the lower substrate 110 and the upper substrate 140. The liquid crystal layer 130 may be disposed on the thin film transistor and the touch sensor provided on the lower substrate 110. The liquid crystal layer 130 includes a liquid crystal material such as liquid crystal molecules or liquid crystal polymers. The arrangement of the liquid crystal material is controlled by an electric field applied to the liquid crystal layer 130 to adjust a transmittance of light generated from the backlight unit.

The first polarizer 121 is disposed below the display panel PNL. The first polarizer 121 is attached onto a lower surface of the lower substrate 110 so as to overlap the display area. The second polarizer 122 is disposed on the display panel PNL. The second polarizer 122 is disposed on the upper substrate 140 so as to overlap the display area. Specifically, the second polarizer 122 may be attached onto the antistatic film 150 to be described below.

For example, each of the first polarizer 121 and the second polarizer 122 may be formed by stretching polyvinyl alcohol dyed with iodine (I), but is not limited thereto. In each of the first polarizer 121 and the second polarizer 122, an absorption axis is formed in the stretching direction to absorb light oscillating in a direction parallel to the absorption axis and selectively transmit only light oscillating in a direction perpendicular to the absorption axis. Accordingly, the optical characteristic and the display quality of the display device 100 may be further improved.

The antistatic film 150 is disposed above the display panel PNL. The antistatic film 150 minimizes a damage and a touch sensing error caused due to charges accumulated by the static electricity generated during the manufacturing and usage of the display device 100. The antistatic film 150 is disposed on the upper surface of the upper substrate 140. The antistatic film 150 is formed to be in direct contact with the upper surface of the upper substrate 140. When the antistatic film 150 is formed to be in direct contact with the upper surface of the upper substrate 140, as compared to the structure in which the antistatic film is formed on the upper surface of the second polarizer in the related art, the process is simplified to improve the productivity and save the manufacturing cost.

Specifically, when the antistatic film is formed on the upper surface of the second polarizer, the second polarizer in which the antistatic film is formed is attached onto the display panel and a connection member, such as a conductive tape, is attached so as to connect one end of the antistatic film and the ground pad. Thereafter, conductive members are dotted in each of a contact area of one end of the connection member and the antistatic film and a contact area of the other end of the connection member and the ground pad to be electrically connected. In contrast, as illustrated in FIG. 2, when the antistatic film 150 is directly disposed on the upper substrate 140, a connection member for connecting the antistatic film 150 and the ground pad GND is not necessary. Further, the electric connection between the antistatic film 150 and the ground pad GND may be allowed only by dotting the conductive member AGP by a single process, without dotting the conductive member at both ends of the connection member. As a result, the process efficiency may be improved and cost may be saved.

Hereinafter, a connection structure between the antistatic film 150 and the ground pad GND in the display device 100 according to the exemplary embodiment of the present disclosure will be described in detail.

Each of the lower substrate 110 and the upper substrate 140 may further extend to the outside of the first polarizer 121 and the second polarizer 122. One ends of the lower substrate 110 and the upper substrate 140 further extend outwardly from one end of the first polarizer 121 and the second polarizer 122.

One end of the lower substrate 110 may further extend to the outside from one end of the upper substrate 140. The ground pad GND is not covered by the upper substrate 140, but is disposed on the exposed lower substrate 110.

As described above, the antistatic film 150 is directly disposed on the upper substrate 140. Therefore, one end of the antistatic film 150 may further extend to the outside from one end of the second polarizer 122 so as to correspond to the upper substrate 140.

The conductive member AGP is disposed so as to electrically connect the upper surface of the antistatic film 150 which is exposed without being covered by the second polarizer 122 and the ground pad GND. The conductive member AGP extends to the outside from the second polarizer 122 to be in direct contact with the upper surface of the antistatic film 150 which is exposed without being covered by the second polarizer 122, a side surface of the antistatic film 150, a side surface of the upper substrate 140, and an upper surface of the ground pad GND. As described above, the antistatic film 150 is connected to the ground pad GND by the conductive member AGP so that charges accumulated by the static electricity generated in the display device 100 may be discharged to the outside.

For example, the conductive member AGP may be formed of a metal material selected from gold, silver, and copper. For example, the conductive member AGP may be formed by dotting a conductive paste including an adhesive binder resin and silver (Ag), but is not limited thereto.

Hereinafter, the antistatic film 150 will be described in detail. The antistatic film 150 includes a silicon-based matrix, a polythiophene-based compound, and a dopant having a high boiling point. The polythiophene-based compound and the dopant having a high boiling point are dispersed in the silicon-based matrix.

The polythiophene-based compound is a conductive polymer to effectively discharge the static electricity and does not degrade the touch sensitivity to be maintained high. A material such as ITO which is a transparent conductive metal material used as an antistatic film of the related art has a very low surface resistance to discharge charges accumulated by touch so that a capacitance change generated by the touch is not accurately sensed, which degrades the touch sensitivity. Further, a polythiophene-based compound has advantages of excellent light transmittance and much lower cost compared to a carbon nano tube used for a conductive material of the related art. Therefore, when a polythiophene-based compound is used as a conductive material of the antistatic film 150, the transmittance of the antistatic film 150 is improved so that the optical characteristic of the display device 100 is excellent and the manufacturing cost may be saved.

For example, the polythiophene-based compound may be poly(3,4-ethylene dioxythiophene):poly(styrenesulfonate) [PEDOT:PSS]. This is advantageous in that the electric conductivity is excellent so that it is effective to suppress the static electricity. If necessary, the conductive material may further optionally include a conductive polymer selected from polyaniline, polyacetylene, polypyrrole, polythiophene, and poly sulfur nitride.

For example, an average particle size of the polythiophene compound may be 30 nm to 70 nm or 50±10 nm. Within this range, the aggregation between particles at a high temperature is suppressed to suppress the localization of the electrons due to aggregation so that a stable resistance characteristic at the high temperature is shown. Generally, in the polythiophene-based compound, the aggregation between particles is caused by the heat so that the uniformity of the particle distribution is degraded, and in this case, there is a problem in that the contact resistance is increased. When the average particle size is approximately 50±10 nm and the particle size distribution is uniform, the aggregation between particles is suppressed so that the electrical characteristic is stably maintained even at the high temperature.

The dopant having a high boiling point interrupts the interaction between the polythiophene-based compounds so that the polythiophene-based compounds may be evenly dispersed in the silicon-based matrix. Therefore, the electrical characteristic and the high temperature stability of the antistatic film 150 may be improved. The polythiophene-based compound has a high tendency to become entangled with each other due to interaction between chains. Accordingly, it is utilized as PEDOT:PSS in which poly(styrenesulfonate) is doped on polythiophene. However, even though it is introduced in the form of PEDOT:PSS, the chains are entangled at the high temperature so that there is a problem in that the high temperature reliability is degraded. The dopant having a high boiling point further weakens the interaction between PEDOT:PSS chains and suppresses the aggregation, thereby improving electrical characteristics and high-temperature stability.

For example, the dopant having a high boiling point may be a compound having a boiling point of 190° C. to 260° C. and a vapor pressure (25° C.) of 0.100 mmHg or lower. In this case, the high temperature reliability of the antistatic film 150 is further excellent. Specifically, for example, the dopant having a high boiling point may be one or more selected from ethyleneglycol and diethyleneglycol. These materials easily penetrate between the polythiophene chains and interact with each of the polythiophene and poly(styrenesulfonate) chains so that the polymer chains are not aggregated and maintained in a linear structure. Therefore, the electrical characteristic and the high temperature stability of the antistatic film 150 may be improved.

The silicon-based matrix evenly disperses the polythiophene-based compound and the dopant having a high boiling point and assigns a heat resistance and a moisture resistance to the antistatic film 150. The silicon-based matrix may be formed by a sol-gel reaction of a solution containing tetraalkoxysilane, glycidyloxyalkyl trialkoxysilane, aminoalkyl trialkoxysilane, (per)fluoroalkyl alkoxysilane and a compound represented by Chemical Formula 1.

[Chemical Formula 1]

In Chemical Formula 1, $R_1$ is selected from hydrogen, an alkyl group having 1 to 10 carbon atoms, and a branched alkyl group having 3 to 10 carbon atoms, n is an integer of 1 to 100 or 1 to 10, and m is an integer of 1 to 10.

The silicon-based matrix may be formed from a silane sol solution containing acid catalyst, alcohol-based solvent, water, tetraalkoxysilane, glycidyloxyalkyl trialkoxysilane, aminoalkyl trialkoxysilane, (per)fluoroalkyl alkoxysilane and a compound represented by Chemical Formula 1.

Water is added for hydrolysis of the alkoxysilane-based compound. The acid catalyst is added to promote hydrolysis of water and the alkoxysilane-based compound and for the cross linkage. For example, the acid catalyst may be selected from hydrochloric acid, sulfuric acid, phosphoric acid, nitric acid, and acetic acid, but is not limited thereto. The alcohol-based solvent is a reaction medium, and for example, may be selected from methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol or cyclohexanol.

The alkoxysilane-based compound is hydrolyzed in water, an acid catalyst, and an alcohol-based solvent to form a silane sol, and the silane sol is polymerized and cross-linked through a condensation reaction to form a silicon-based matrix. The polythiophene-based compound and the dopant having a high boiling point are added to the silane sol solution to be evenly dispersed in the silicon-based matrix.

Hereinafter, each of an alkoxysilane-based compound included in the silane sol solution and a compound represented by Chemical Formula 1 will be described.

The tetra alkoxysilane is contained as a binder. The tetra alkoxysilane has an advantage of excellent adhesiveness with the upper substrate 140 which is a base material. For example, the tetra alkoxysilane may be selected from tetra ethoxysilane, tetra methoxysilane, and tetra-n-propoxysilane.

Polythiophene-based compounds, which are conductive materials, have advantages of being transparent and inexpensive compared to conventional carbon nanotubes, but have disadvantages in that they are relatively weak in heat resistance and moisture resistance. Accordingly, even though the carbon nano tube is expensive, the carbon nano tube is mainly used as the antistatic film material. Therefore, according to the exemplary embodiment of the present disclosure, in order to supplement the heat resistance of the polythiophene-based compound, glycidyloxyalkyl trialkoxysilane and aminoalkyl trialkoxysilane are added to complement the heat resistance of polythiophene-based compounds.

First, glycidyloxyalkyl trialkoxysilane is a curing additive to improve the heat resistance of the polythiophene compound. For example, when the polythiophene-based compound is PEDOT:PSS, the glycidyl group of glycidyloxyalkyl tri alkoxy silane may be bonded with sulfonate group (—$SO_3$—) of PSS during the curing. Accordingly, when the PEDOT:PSS is not simply dispersed in the silicon-based matrix, but forms a chemical bond with the silicon-based matrix to improve the electrical characteristic and heat resistance. Further, the glycidyloxyalkyl trialkoxysilane improves the reliability of the antistatic film 150 by suppressing oxidation of the polythiophene-based compound.

For example, glycidyloxyalkyl trialkoxysilane may be at least one selected from (3-glycidyloxypropyl) triethoxysilane and (3-glycidyloxypropyl) trimethoxysilane.

The aminoalkyl trialkoxysilane improves the heat resistance of the antistatic film 150 to improve a high temperature reliability. Further, the aminoalkyl trialkoxysilane improves the adhesiveness with the upper substrate 140. For example, the aminoalkyl trialkoxysilane may be one or more selected from (3-aminopropyl) triethoxysilane and (2-aminoethyl-3-aminopropyl) trimethoxysilane.

Figure 3:
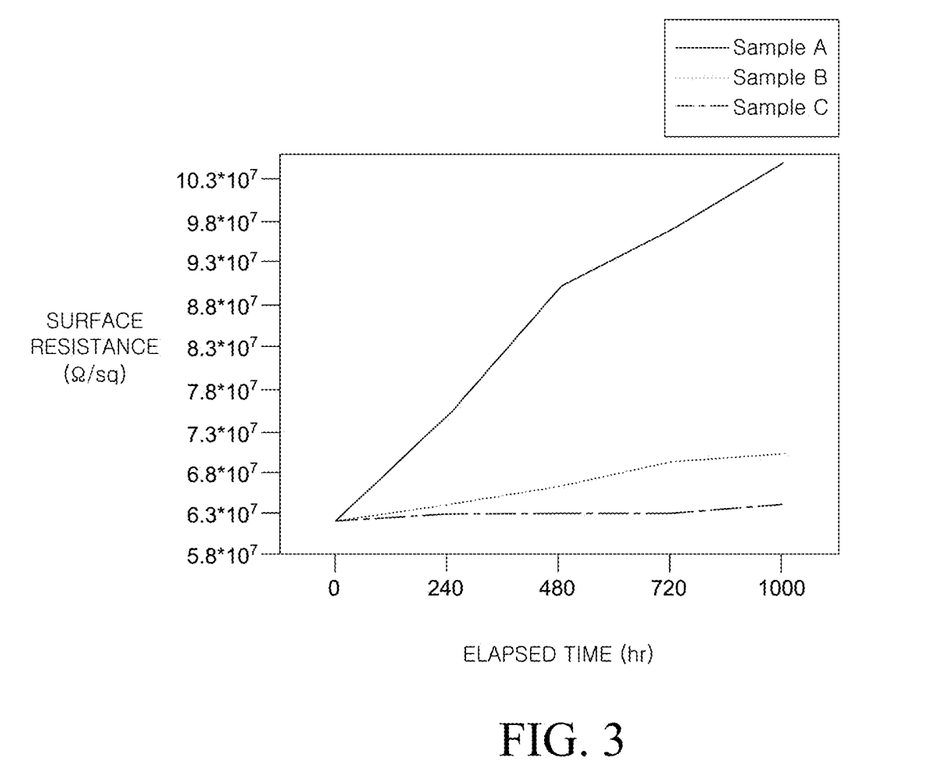
FIG. 3 is a graph illustrating a surface resistance change of an antistatic film over a time depending on the presence of glycidyloxyalkyl trialkoxysilane and/or aminoalkyl trialkoxysilane.

When glycidyloxyalkyl trialkoxysilane and aminoalkyl trialkoxysilane are added together, the heat resistance can be significantly improved as a synergistic effect compared to when only one of them is added. This will be described in detail with reference to FIG. 3. FIG. 3 is a graph illustrating a surface resistance change of an antistatic film over a time depending on the presence of glycidyloxyalkyl trialkoxysilane and/or aminoalkyl trialkoxysilane. In FIG. 3, Sample A is an antistatic film in which PEDOT:PSS is dispersed in a silicon-based matrix which does not include both (3-glycidyloxypropyl) trimethoxysilane (GOPS) and aminoalkyl trialkoxysilane (ATS). Sample B is an antistatic film in which PEDOT:PSS is dispersed in a silicon-based matrix which includes GOPS. Sample C is an antistatic film in which PEDOT:PSS is dispersed in a silicon-based matrix including both GOPS and ATS. A surface resistance was measured immediately after manufacturing the antistatic films according to each of Sample A, Sample B, and Sample C, and was measured whenever a predetermined time elapsed while storing the antistatic films under a condition of a temperature of 105° ° C. The surface resistance was measured using a ST-4 surface resistance meter of SYMCO JAPAN.

Referring to FIG. 3, it may be confirmed that in Sample A which does not include GOPS and ATS, the surface resistance is sharply increased from the beginning of the high temperature reliability evaluation and the surface resistance is consistently increased for 1000 hours without being stabilized. In the meantime, in the case of Sample B including GOPS, even though the fluctuation range of the resistance is significantly alleviated as compared to Sample A, it is confirmed that the resistance is consistently increased without being stabilized. Further, in the case of Sample C including both GOPS and ATS, it may be confirmed that there is almost no change in the resistance for 1000 hours so that the electrical characteristic is stably maintained at a high temperature. From this, it may be understood that when glycidyloxyalkyl trialkoxysilane and aminoalkyl trialkoxysilane are added together, the electrical characteristic is stably maintained at a high temperature so that the high temperature reliability is significantly improved.

In the antistatic film including a polythiophene-based compound, a water film is formed by moisture at the beginning within 200 hours when reliability is evaluated under the high humidity conditions so that the resistance decreases rapidly. However, the polymer swells and is decomposed due to moisture after a critical time so that the resistance consistently increases to degrade the electrical characteristic. Accordingly, in the exemplary embodiment of the present disclosure, in order to supplement a weak moisture resistance of the polythiophene-based compound, a compound represented by Chemical Formula 1 and (per)fluoroalkyl alkoxysilane are added.

First, the compound represented by Chemical Formula 1 is a compound in which some atom (group) which constitutes a side chain of polyacrylate is substituted with a silanol group. This compound is contained in a silane sol solution to react, the silanol group is condensation-polymerized to form an organic-inorganic complex in which polyacrylate is bonded to silica particles. Further, the silanol group may also be condensation-polymerized with another alkoxysilane-based compound contained in the silane sol solution.

[Chemical Formula 1]

In Chemical Formula 1, $R_1$ is selected from hydrogen, an alkyl group having 1 to 10 carbon atoms, and a branched alkyl group having 3 to 10 carbon atoms, n is an integer of 1 to 100 or 1 to 10, and m is an integer of 1 to 10.

The silica particle formed by condensation polymerization of the silanol group of the compound represented by Chemical Formula 1 has a porous structure and absorbs moisture to suppress decomposition of the polythiophene-based compound by moisture. Accordingly, the high moisture reliability of the antistatic film 150 may be improved.

The compound represented by Chemical Formula 1 has relatively hydrophilicity to absorb the moisture to suppress the degradation of the antistatic film 150, but (per)fluoroalkyl alkoxysilane has a water repellent property to suppress the permeation of the moisture. The (per)fluoroalkyl group of (per)fluoroalkyl alkoxysilane has strong hydrophobicity to suppress the permeation of the moisture. Further, the (per)fluoroalkyl group is a functional group having an excellent heat resistance to contribute to improvement of heat resistance.

For example, (per)fluoroalkyl alkoxysilane may be a compound represented by the following Chemical Formula 2.

[Chemical Formula 2]

In Chemical Formula 2, $R_2$, $R_3$, and $R_4$ are independently selected from an alkyl group having 1 to 10 carbon atoms and a branched alkyl group having 3 to 10 carbon atoms, a is an integer of 1 to 10, and b is an integer of 1 to 10.

The alkoxysilane group of the (per)fluoroalkyl alkoxysilane interacts and chemically bonds with another alkoxysilane-based compound included in the silane sol solution. Accordingly, even though a hydrophobic functional group is included, the alkoxysilane group may be well dispersed in the silane sol solution without causing phase separation.

When the compound represented by Chemical Formula 1 and (per)fluoroalkyl alkoxysilane are added together, the moisture resistance can be significantly improved as a synergistic effect compared to when only one of them is added to provide an advantage of high humidity reliability.

The silicon-based matrix may be formed to further include a random type silsesquioxane compound, a cage type silsesquioxane compound, or both of them. When the random type silsesquioxane compound and/or the cage type silsesquioxane compound are further included, there is an advantage in that the density and the hardness of the antistatic film 150 are further improved so that the reliability is excellent.

The random type silsesquioxane compound and/or the cage type silsesquioxane compound are added to the silane sol solution. The alkoxysilane-based compound is hydrolyzed by water and an acid catalyst to form a silanol, and the silanol may react with the —OH group of the silsesquioxane compound to be bonded.

The antistatic film 150 may be formed by applying and curing an antistatic film coating solution in which a polythiophene-based compound and a dopant having a high boiling point are added to the above-described silane sol solution containing the acid catalyst, the alcohol solvent, water, tetraalkoxysilane, glycidyloxyalkyl trialkoxysilane, aminoalkyl trialkoxysilane, (per)fluoroalkyl alkoxysilane, and a compound represented by Chemical Formula 1 on the upper substrate 140. For example, the antistatic film coating solution may be applied on the upper substrate 140 by a known method such as a slit coating method, a knife coating method, a spin coating method, a casting method, a micro gravure coating method, a gravure coating method, a bar coating method, a roll coating method, a wire bar coating method, a dip coating method, a spray coating method, a screen printing method, a gravure printing method, a flexographic printing method, an offset printing method, an inkjet coating method, a dispenser printing method, a nozzle coating method, and a capillary coating method. After the application, the antistatic coating solution is heated at a predetermined temperature to be cured to form the antistatic film 150.

If necessary, additives such as a leveling agent, a silane coupling agent, a dispersant, and a surfactant may be further optionally added to the antistatic film coating solution.

For example, a surface resistance of the antistatic film 150 may be $10^7$ Ω/sq to $10^9$ Ω/sq. Accordingly, the display device 100 according to the exemplary embodiment of the present disclosure provides advantages of excellent touch sensitivity and excellent static electricity discharging property. When the surface resistance of the antistatic film 150 is too low, the voltage generated when the user touches the display device 100 is discharged by the antistatic film 150 so that the touch sensitivity is significantly lowered. When the surface resistance of the antistatic film 150 is too high, the touch sensitivity is excellent, but there may be problems in that a discharging speed of the static electricity generated during the manufacturing process of the display device 100 or when the display device 100 is used is too slow or the static electricity is not discharged.

The antistatic film 150 according to the exemplary embodiment of the present disclosure includes a polythiophene-based compound cheaper than a transparent conductive material of the related art such as ITO or a carbon nano tube so that the manufacturing cost of the display device may be significantly saved. Further, according to the present disclosure, in order to supplement the weak heat resistance and moisture resistance of the polythiophene-based compound, a dopant having a high boiling point and a silicon-based matrix having a specific composition are used. By doing this, when the high temperature and high humidity reliability are evaluated, the high electrical characteristic may be maintained for a long time.

For example, a difference between the highest value and the lowest value of the surface resistance measured under the condition of a temperature of 60° C., a relative humidity of 90% for 1000 hours is $0.5*10^7$ Ω/sq or lower so that the surface resistance may be stably maintained under the high temperature and high humidity conditions.

Hereinafter, the effects of the present disclosure will be described in more detail with reference to Examples. However, the following Examples are set forth to illustrate the present disclosure, but the scope of the disclosure is not limited thereto.

Reference Example 1

In a reflux reactor, tetraethoxysilane (TEOS) and ethanol were added in parts by weight as described in Table 1 and mixed, and agitated after adding water and then a 3.5% aqueous hydrochloric acid solution was slowly dropped. Next, (3-glycidyloxypropyl) trimethoxysilane (GOPS), (3-aminopropyl) triethoxysilane (ATS), PEDOT:PSS, ethylene glycol (EG), and a leveling agent were added in parts by weight as described in Table 1 to prepare an antistatic film coating solution. The antistatic film coating solution was spin-coated (400 rpm, 15 seconds) on a glass substrate, was heated at 140° C. for 10 minutes, and dried for 30 minutes using a hot air dryer to form an antistatic film.

Reference Example 2, Reference Example 3, and Comparative Example 1

The antistatic film was formed by the same method as Reference Example 1 except that the antistatic film coating solution material was added as described in Table 1.

TABLE 1

|  | Comparative Example 1 | Reference Example 1 | Reference Example 2 | Reference Example 3 |
| --- | --- | --- | --- | --- |
| PEDOT:PSS | 2.5 | 2.5 | 2.5 | 2.5 |
| TEOS | 1.0 | 1.0 | 1.0 | 1.0 |
| Ethanol | 96.1 | 96.0 | 95.9 | 95.8 |
| EG | 0.1 | 0.1 | 0.1 | 0.1 |
| GOPS | — | 0.1 | 0.1 | 0.2 |
| ATS | — | — | 0.1 | 0.1 |
| Leveling Agent | 0.3 | 0.3 | 0.3 | 0.3 |

Experimental Example 1

Figure 4:
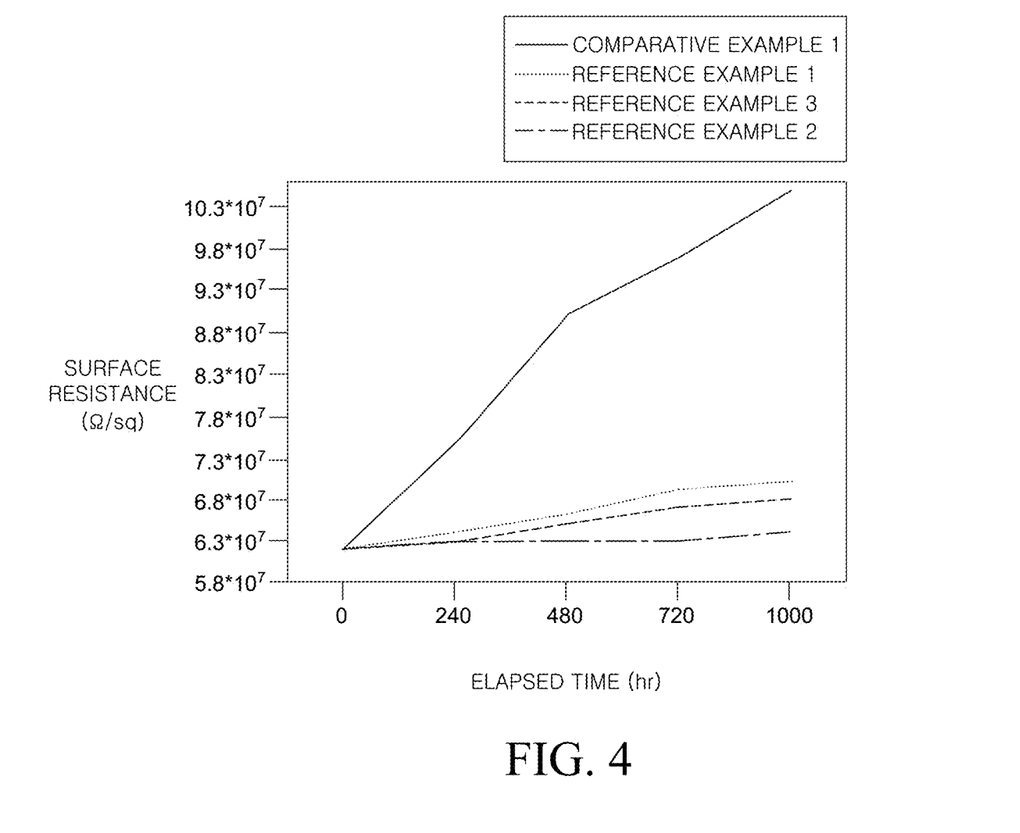
FIG. 4 is a graph illustrating a surface resistance change of an antistatic film according to each of Comparative Example 1, and Reference Examples 1 to 3 over a time.

In order to evaluate the high temperature reliability of the antistatic film according to each of Comparative Example 1 and Referential Examples 1 to 3, a surface resistance was measured immediately after preparing a specimen, stored under a high temperature condition of a temperature of 105° C., and a surface resistance was measured whenever a predetermined time elapsed. The surface resistance was measured using a ST-4 surface resistance meter of SYMCO JAPAN. The result thereof was described in Table 2 and FIG. 4. FIG. 4 is a graph illustrating a surface resistance change of an antistatic film according to each of Comparative Example 1 and Reference Examples 1 to 3 over a time.

TABLE 2

|  | Comparative Example 1 | Reference Example 1 | Reference Example 2 | Reference Example 3 |
| --- | --- | --- | --- | --- |
| 0 hr | $6.2*10^7$ | $6.2*10^7$ | $6.2*10^7$ | $6.2*10^7$ |
| 240 hr | $7.5*10^7$ | $6.4*10^7$ | $6.3*10^7$ | $6.3*10^7$ |
| 480 hr | $9.0*10^7$ | $6.6*10^7$ | $6.3*10^7$ | $6.5*10^7$ |
| 720 hr | $9.7*10^7$ | $6.9*10^7$ | $6.3*10^7$ | $6.7*10^7$ |
| 1000 hr | $10.5*10^7$ | $7.0*10^7$ | $6.4*10^7$ | $6.8*10^7$ |

(Unit of surface resistance: Ω/sq)

Referring to Table 2 and FIG. 4 together, it was confirmed that in Comparative Example 1 which does not include both GOPS and ATS, as compared to Reference Examples 1 to 3, the surface resistance was rapidly increased from the beginning of the high temperature reliability evaluation. Further, the surface resistance was not stabilized for 1000 hours, but was consistently increased.

According to Reference Examples 1 to 3 including at least one of GOPS and ATS, it was confirmed that the resistance change range is small and stable as compared to Comparative Example 1. It was further confirmed that the high temperature reliability of Reference Examples 1 and 2 including both GOPS and ATS was more excellent. Specifically, in the case of Reference Example 2 including GOPS and ATS at the same content, it was confirmed that the resistance change range was smallest so that the high temperature reliability was most excellent.

In order to understand the improvement effect of not only the high temperature reliability, but also the high humidity reliability, a compound represented by Chemical Formula 1 and/or Chemical Formula 2 was further included to manufacture the antistatic film and high temperature and high humidity reliability evaluation was carried out. For reference, in order to compare the high temperature and high humidity reliability improvement effect depending on the presence of a specific compound, the high temperature and high humidity reliability evaluation was conducted also on the antistatic film according to Comparative Example 1 and Reference Example 2.

Example 1

In a reflux reactor, tetraethoxysilane (TEOS) and ethanol were added in parts by weight as described in Table 1 and mixed, and agitated after adding water and then a 3.5% aqueous hydrochloric acid solution was slowly dropped. Next, (3-glycidyloxypropyl) trimethoxysilane (GOPS), (3-aminopropyl) triethoxysilane (ATS), a compound represented by Chemical Formula 1, PEDOT:PSS, ethylene glycol (EG), and a leveling agent were added in parts by weight as described in Table 1 to prepare an antistatic film coating solution. The antistatic film coating solution was spin-coated (400 rpm, 15 seconds) on a glass substrate, was heated at 140° C. for 10 minutes, and dried for 30 minutes using a hot air dryer to form an antistatic film.

Example 2 and Example 3

The antistatic film was formed by the same method as Example 1 except that the antistatic film coating solution materials was added as described in Table 3.

TABLE 3

| | Comparative Example 1 | Reference Example 2 | Example 1 | Example 2 | Example 3 |
|---|---|---|---|---|---|
| PEDOT:PSS | 2.5 | 2.5 | 2.5 | 2.5 | 2.5 |
| TEOS | 1.0 | 1.0 | 1.0 | 1.0 | 1.0 |
| Ethanol | 96.1 | 95.9 | 95.4 | 95.4 | 94.9 |
| EG | 0.1 | 0.1 | 0.1 | 0.1 | 0.1 |
| GOPS | — | 0.1 | 0.1 | 0.1 | 0.1 |
| ATS | — | 0.1 | 0.1 | 0.1 | 0.1 |
| Chemical Formula 1 | — | — | 0.5 | — | 0.5 |
| Chemical Formula 2 | — | — | — | 0.5 | 0.5 |
| Leveling agent | 0.3 | 0.3 | 0.3 | 0.3 | 0.3 |

(In Table 3, a content unit of each component is part by weight and is based on 100 parts by weight which is a total weight of the entire component.)

Experimental Example 2

Figure 5:
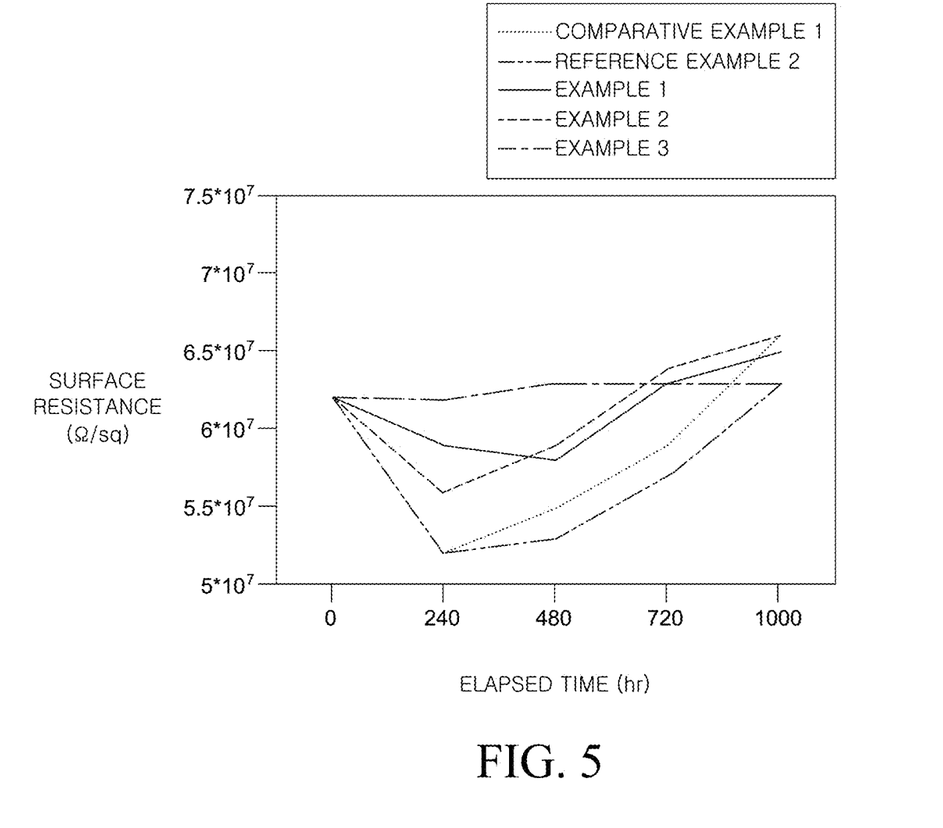
FIG. 5 is a graph illustrating a surface resistance change of an antistatic film according to each of Examples 1 to 3, Comparative Example 1, and Reference Example 2 over a time.

In order to evaluate the high temperature and high humidity reliability of the antistatic film according to each of Examples 1 to 3, Comparative Example 1, and Referential Example 2, a surface resistance was measured immediately after preparing a specimen, stored under a condition of a temperature of 60° C. and a relative humidity of 90%, and a surface resistance was measured whenever a predetermined time elapsed. The surface resistance was measured using a ST-4 surface resistance meter of SYMCO JAPAN. The result thereof was described in Table 4 and FIG. 5. FIG. 5 is a graph illustrating a surface resistance change of an antistatic film according to Examples 1 to 3, Comparative Example 1, and Reference Examples 2 over a time.

TABLE 4

| | Comparative Example 1 | Reference Example 2 | Example 1 | Example 2 | Example 3 |
|---|---|---|---|---|---|
| 0 hr | $6.2*10^7$ | $6.2*10^7$ | $6.2*10^7$ | $6.2*10^7$ | $6.2*10^7$ |
| 240 hr | $5.2*10^7$ | $5.2*10^7$ | $5.9*10^7$ | $5.6*10^7$ | $6.2*10^7$ |
| 480 hr | $5.5*10^7$ | $5.3*10^7$ | $5.8*10^7$ | $5.9*10^7$ | $6.3*10^7$ |
| 720 hr | $5.9*10^7$ | $5.7*10^7$ | $6.3*10^7$ | $6.4*10^7$ | $6.3*10^7$ |
| 1000 hr | $6.6*10^7$ | $6.3*10^7$ | $6.5*10^7$ | $6.6*10^7$ | $6.4*10^7$ |

(Unit of surface resistance: Ω/sq)

Referring to Table 4 together, it is confirmed that the surface resistances immediately after manufacturing the antistatic films according to each of Examples 1 to 3, Reference Example 2, and Comparative Example 1 are equal. Referring to FIG. 5 together, it may be confirmed that in the antistatic film of Example 3, the surface resistance is hardly changed for 1000 hours under the high temperature and high humidity condition so that the electrical characteristic is stably maintained. That is, when all GOPS, ATS, the compound of Chemical Formula 1, and the compound of Chemical Formula 2 are included, the high temperature and high humidity characteristics are simultaneously improved.

In contrast, in the antistatic film of Comparative Example 1 which is manufactured without including GOPS, ATS, the compound of Chemical Formula 1, and the compound of Chemical Formula 2, the surface resistance is sharply lowered in the beginning of the reliability evaluation and after 240 hours, the surface resistance is sharply increased. Accordingly, it may be confirmed that the electrical characteristic is not stable under the high temperature and high humidity condition.

Further, in Reference Example 2 including GOPS and ATS, as compared to Examples 1 to 3, the high temperature and high humidity condition is deteriorated, but a stability is slightly improved compared to Comparative Example 1.

Further, in Example 1 including GOPS, ATS, and the compound of Chemical Formula 1, it may be confirmed that the initial resistance change range is relieved compared to Comparative Example 1 and Reference Example 2. Further, also in Example 2 including GOPS, ATS, and the compound of Chemical Formula 2, it may be confirmed that the initial resistance change range is smaller than that of Comparative Example 1 and Reference Example 2.

From Experimental Example, it may be confirmed that GOPS, ATS, the compound of Chemical Formula 1, and the compound of Chemical Formula 2 supplement the heat resistance and the moisture resistance of PEDOT:PSS to significantly improve the high temperature and high humidity reliability of the antistatic film.

The exemplary embodiments of the present disclosure can also be described as follows:

According to an aspect of the present disclosure, a display device comprise a display panel; a first polarizer disposed below the display panel; a second polarizer disposed on the display panel; and an antistatic film disposed between the display panel and the second polarizer, wherein the antistatic film includes a silicon-based matrix and a polythiophene-based compound and a dopant having a high boiling point dispersed in the silicon-based matrix and the silicon-based matrix contains tetra alkoxysilane, glycidyloxyalkyl trialkoxysilane, and aminoalkyl trialkoxysilane to be cured.

The silicon-based matrix may be cured further including one or more of (per)fluoroalkyl alkoxysilane and a compound represented by the following Chemical Formula 1.

[Chemical Formula 1]

(In Chemical Formula 1, $R_1$ may be selected from hydrogen, an alkyl group having 1 to 10 carbon atoms, and a branched alkyl group having 3 to 10 carbon atoms, n is an integer of 1 to 10, and m may be an integer of 1 to 10.)

The polythiophene-based compound may be poly(3,4-ethylene dioxythiophene):poly(styrenesulfonate) [PEDOT:PSS].

The dopant having a high boiling point may be a compound having a boiling point of 190° C. to 260° C. and a vapor pressure (25° C.) of 0.100 mmHg or lower.

The dopant having a high boiling point may be one or more selected from ethyleneglycol and diethyleneglycol.

The glycidyloxyalkyl trialkoxysilane may be one or more selected from (3-glycidyloxypropyl) triethoxysilane and (3-glycidyloxypropyl) trimethoxysilane.

The aminoalkyl trialkoxysilane may be one or more selected from (3-aminopropyl) triethoxysilane and (2-aminoethyl-3-aminopropyl) trimethoxysilane.

The (per)fluoroalkyl alkoxysilane may be a compound represented by the following Chemical Formula 2.

[Chemical Formula 2]

(In Chemical Formula 2, $R_2$, $R_3$, and $R_4$ may be independently selected from an alkyl group having 1 to 10 carbon atoms and a branched alkyl group having 3 to 10 carbon atoms, a may be an integer of 1 to 10, and b may be an integer of 1 to 10.)

The silicon-based matrix may be cured further including a random type silsesquioxane compound, a cage type silsesquioxane compound, or both of them.

The display panel may include a lower substrate disposed on the first polarizer; a liquid crystal layer disposed on the lower substrate; and an upper substrate disposed on the liquid crystal layer, wherein one end of the antistatic film and the upper substrate may further extend to the outside from one end of the second polarizer, and one end of the lower substrate may further extend to the outside from one end of the upper substrate and the antistatic film.

The display device may further comprise a ground pad which is disposed on the lower substrate further extending to the outside from the upper substrate and the antistatic film; and a conductive member which connects the antistatic film and the ground pad.

The conductive member may be in direct contact with an upper surface of the antistatic film which extends more than the second polarizer and the ground pad and is disposed to cover a side surface of the antistatic film and a side surface of the upper substrate.

The display panel may be an in-cell touch type display panel with an embedded touch sensor.

A difference between the highest value and the lowest value of the surface resistance of the antistatic film measured under the condition of a temperature of 60° C., a relative humidity of 90% for 1000 hours may be $0.5*10^7$ Ω/sq or lower.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
a display panel;
a first polarizer disposed below the display panel;
a second polarizer disposed on the display panel; and
an antistatic film disposed between the display panel and the second polarizer,
wherein the antistatic film includes a silicon-based matrix and a polythiophene-based compound and a dopant having a high boiling point dispersed in the silicon-based matrix and the silicon-based matrix contains tetra alkoxysilane, glycidyloxyalkyl trialkoxysilane, and aminoalkyl trialkoxysilane to be cured,
wherein the silicon-based matrix is cured further including one or more of (per)fluoroalkyl alkoxysilane and a compound represented by the following Chemical Formula 1:

[Chemical Formula 1]

wherein in Chemical Formula 1, $R_1$ is selected from hydrogen, an alkyl group having 1 to 10 carbon atoms, and a branched alkyl group having 3 to 10 carbon atoms, n is an integer of 1 to 10, and m is an integer of 1 to 10.

2. The display device according to claim 1, wherein the polythiophene-based compound is poly(3,4-ethylene dioxythiophene):poly(styrenesulfonate) [PEDOT:PSS].

3. The display device according to claim 1, wherein the dopant having a high boiling point is a compound having a boiling point of 190° C. to 260° C. and a vapor pressure (25° C.) of 0.100 mmHg or lower.

4. The display device according to claim 1, wherein the dopant having a high boiling point is one or more selected from ethyleneglycol and diethyleneglycol.

5. The display device according to claim 1, wherein the glycidyloxyalkyl trialkoxysilane is one or more selected from (3-glycidyloxypropyl) triethoxysilane and (3-glycidyloxypropyl) trimethoxysilane.

6. The display device according to claim 1, wherein the aminoalkyl trialkoxysilane is one or more selected from (3-aminopropyl) triethoxysilane and (2-aminoethyl-3-aminopropyl) trimethoxysilane.

7. The display device according to claim 1, wherein the (per)fluoroalkyl alkoxysilane is a compound represented by the following Chemical Formula 2

[Chemical Formula 2]

wherein in Chemical Formula 2, $R_2$, $R_3$, and $R_4$ are independently selected from an alkyl group having 1 to 10 carbon atoms and a branched alkyl group having 3 to 10 carbon atoms, a is an integer of 1 to 10, and b is an integer of 1 to 10.

8. The display device according to claim 1, wherein the silicon-based matrix is cured further including a random type silsesquioxane compound, a cage type silsesquioxane compound, or both of them.

9. The display device according to claim 1, wherein the display panel includes:

a lower substrate disposed on the first polarizer;
a liquid crystal layer disposed on the lower substrate; and
an upper substrate disposed on the liquid crystal layer,
wherein one end of the antistatic film and the upper substrate further extends to the outside from one end of the second polarizer, and one end of the lower substrate further extends to the outside from one end of the upper substrate and the antistatic film.

10. The display device according to claim 9, further comprising:

a ground pad which is disposed on the lower substrate further extending to the outside from the upper substrate and the antistatic film; and
a conductive member which connects the antistatic film and the ground pad.

11. The display device according to claim 10, wherein the conductive member is in direct contact with an upper surface of the antistatic film which extends more than the second polarizer and the ground pad and is disposed to cover a side surface of the antistatic film and a side surface of the upper substrate.

12. The display device according to claim 1, wherein the display panel is an in-cell touch type display panel with an embedded touch sensor.

13. The display device according to claim 1, wherein a difference between the highest value and the lowest value of the surface resistance of the antistatic film measured under the condition of a temperature of 60° C., a relative humidity of 90% for 1000 hours is $0.5*10^7$ Ω/sq or lower.

* * * * *